July 10, 1928.

A. P. WINTER

GRATE FOR DUMP PITS

Filed March 8, 1926

Inventor
August P. Winter
By his Attorneys

July 10, 1928.
A. P. WINTER
1,676,307
GRATE FOR DUMP PITS
Filed March 8, 1926
3 Sheets-Sheet 2
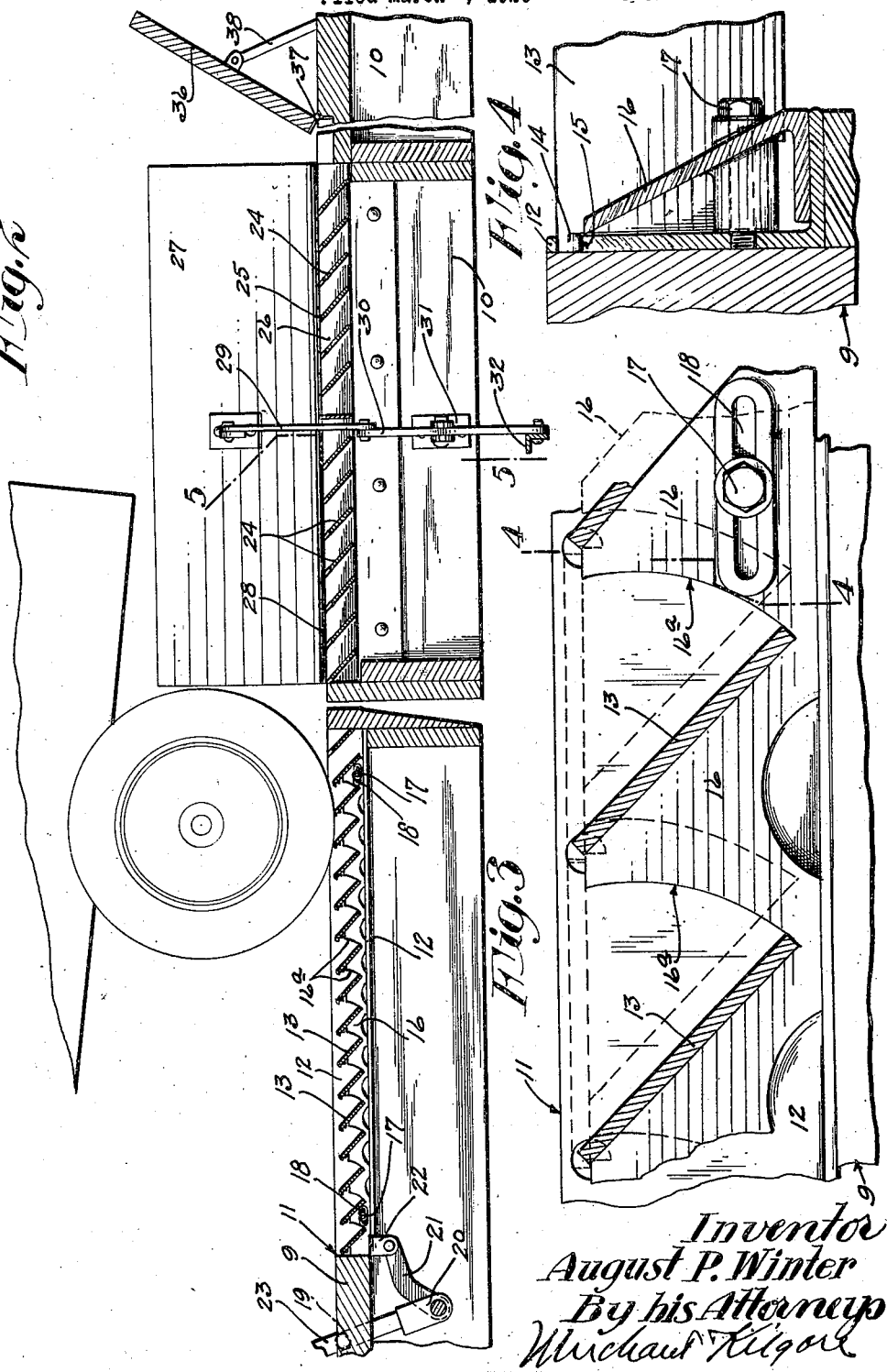
Inventor
August P. Winter
By his Attorney

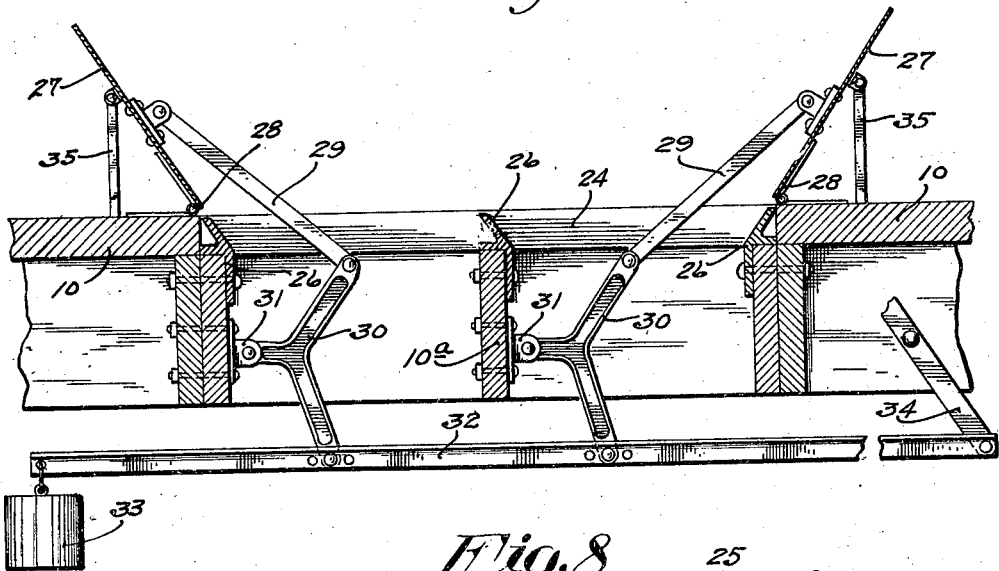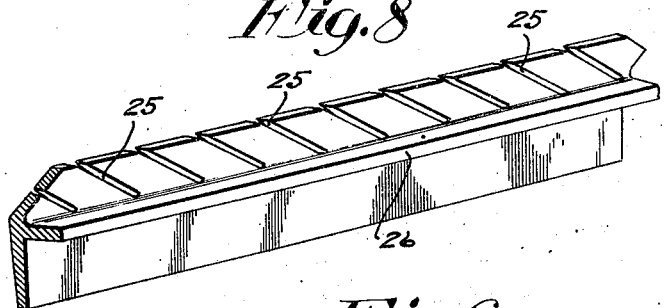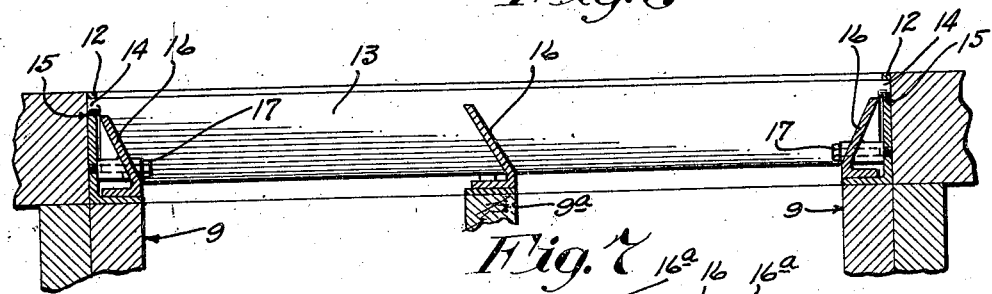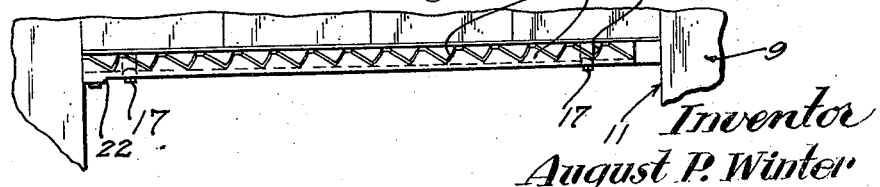

Patented July 10, 1928.

1,676,307

UNITED STATES PATENT OFFICE.

AUGUST P. WINTER, OF MINNEAPOLIS, MINNESOTA, ASSIGNOR, BY MESNE ASSIGNMENTS, TO SAMUEL C. CLOW, OF MINNEAPOLIS, MINNESOTA.

GRATE FOR DUMP PITS.

Application filed March 8, 1926. Serial No. 93,048.

My invention provides a normally open closable grate particularly adapted for use in connection with elevator dump pits and more especially adapted for use in connection with dump pits associated with scales; and, generally stated, the invention consists of the novel devices and combinations of devices hereinafter described and defined in the claims.

In the accompanying drawings, which illustrate the invention, and wherein like characters indicate like parts throughout the several views, the grate is shown as applied in part to a scale platform and in part to an immediately adjacent portion of the fixed platform or driveway.

Referring to the drawings:

Fig. 2 is a vertical section taken on the line 2—2 of Fig. 1;

Fig. 3 is an enlarged fragmentary vertical section taken on the line 3—3 of Fig. 1;

Fig. 4 is a section on the line 4—4 of Fig. 3;

Fig. 5 is a transverse vertical section taken on the line 5—5 of Fig. 2;

Fig. 6 is a transverse vertical section taken on the line 6—6 of Fig. 1;

Fig. 7 is a fragmentary plan view showing a portion of the scale platform, one of the cam bars and the mounting therefor, the grate slats being removed; and Fig. 8 is a fragmentary perspective of one of the rails for holding the fixed grate slats applied in the fixed platform.

Figure 1:
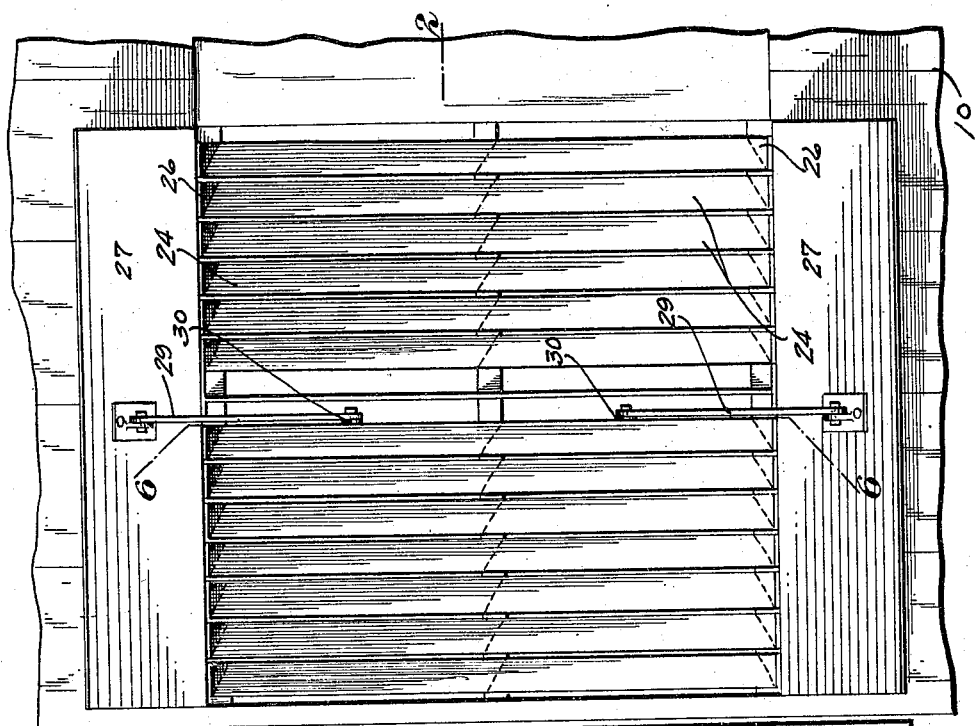
Fig. 1 is a plan view showing portions of the scale platform and fixed platform and illustrating the improved grate structure applied thereto.
Figure 1:
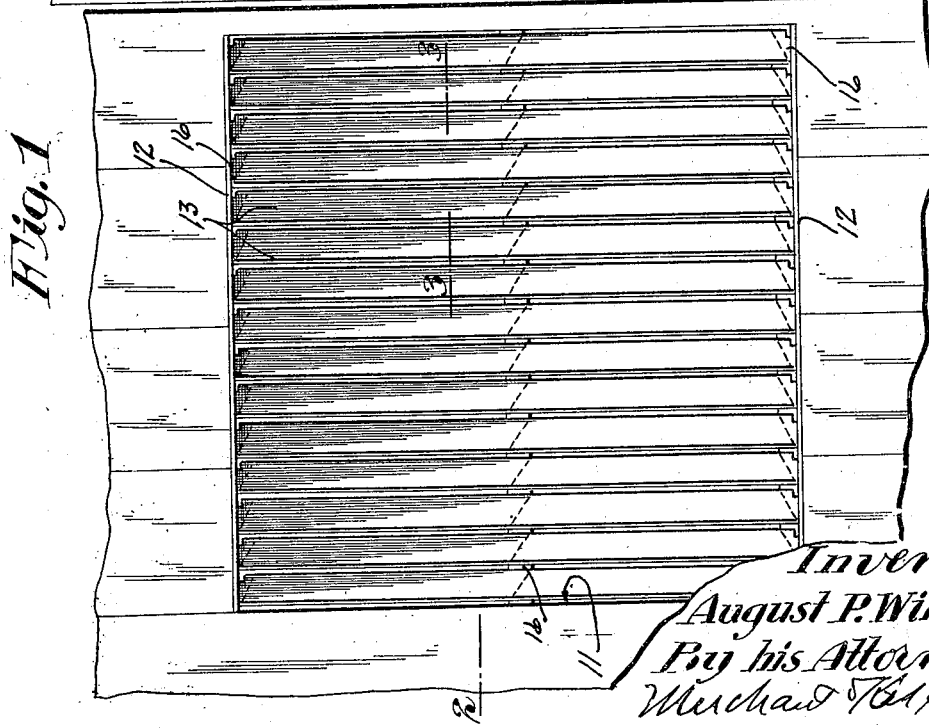

In the drawings, the scale platform is indicated as an entirety by the numeral 9 and the fixed platform by the numeral 10. The grate structure applied in the scale platform will first be described.

For the application of this grate, the scale platform is provided near one end and overlying the pit with an enlarged rectangular opening 11 that extends less than from side to side thereof. Rigidly secured to the scale platform at the longitudinal sides of this opening 11 are frame bars 12, preferably angle irons, set with their lower flanges at their lower edges and extended inward. These frame bars 12 form the direct supports for the grate slats or shutters 13, which latter, at the ends of their upper edges, are provided with projecting trunnions 14 that are seated in perforations 15 formed in the upper portions of the vertical flanges of the said bars 12. It is here important to note that these slats 13, when dropped or turned into oblique positions, extend downward from their trunnions, so that the trunnions support the slats from their upper edges on which a vehicle wheel is adapted to run. Otherwise stated, when the slats are in horizontal positions, they are aligned in the horizontal plane of their trunnions, but when dropped, are moved below said plane and the trunnions are always adjacent to the wheel-engaged portions of the slats. This gives the strongest possible arrangement, as will hereinafter more fully appear.

For moving the grate slats or shutters from horizontal or vertical positions, I provide sliding cam bars 16. As shown, there are three of these cam bars, one at each side and one at the center of the pit opening formed in the scale platform. The two outside cam bars 16 are slidably connected to the adjacent frame bars 12 by retaining screws 17 that work through slots 18 formed in said cam bars and screwed into said frame bars. The central cam bar 16 is mounted to slide on a centrally located supporting beam 9ᵃ of the scale platform 9. All three of the cam bars 16 are provided with deep notches and with intervening cam-acting lugs 16ᵃ, which latter have oblique edge surfaces located below the respective overlying grate slats 13. The three cam bars 16 may be given simultaneous sliding movements by any suitable means, but, as shown, this is accomplished by a rock shaft 19 mounted in suitable bearings on the scale platform and provided with depending arms 20, which, by links 21, are connected to lugs 22 on the adjacent ends of the respective cam bars 16. The rock shaft 19 is shown as provided with an operating lever 23, by the manipulation of which the three cam bars may be simultaneously moved.

When the cam slides 16 are moved forward or toward the left in respect to Figs. 1, 2 and 3, the grate slats 13 will be dropped to oblique positions substantially as shown in Figs. 2 and 3 and the grate will then be open for the dumping of grain or the like therethrough. When the cam bars are moved rearward or toward the right in respect to Figs. 1, 2 and 3, the cam lugs 16ª will be forced under the respective slats 13 and will move the same upward and into the same or approximately the same horizontal plane as indicated by dotted lines in Fig. 3. It will thus be seen that these grate slats are not caused to overlap at any time, but that when the grate is closed by movements thereof into horizontal positions, there will be slight gaps between the same.

The grate structure applied in the fixed platform comprises fixed obliquely set grate slats 24 that are set into oblique slots 25 formed in three flanged frame bars 26 rigidly secured to the fixed platform at the sides of the grate opening and the central member to a fixed beam 10ª of said fixed platform.

For closing or partly closing the openings through the grate formed by the slats 24, I provide door plates 27 hinged to the platform 10 at 28 and connected by links 29 to bell crank levers 30 shown as pivoted to bearing brackets 31 rigidly secured, one to the beam 10ª and the other to one of the beams at the side of the grate opening. The depending arms of the bell cranks 30 are connected to a common operating bar 32, to one end of which is applied a weight 33 and to the other end of which is connected an operating lever 34. When the bar 32 is moved toward the left in respect to Fig. 5, the door plates 27 will be turned down on top of the grate slats 24, but when the bar 32 is moved toward the right, said plates 27 will be turned upward and into outwardly and upwardly flaring positions, so that they will then afford hopper plates to guide the grain into and through the pit opening. For limiting the opening movements of the door plates 27 to positions illustrated in Fig. 5, they are shown as provided with pivoted stop arms 35.

These grates are usually applied to or in connection with scale platforms that are associated with wagon dumps, and the arrangement is usually such that when a wagon is tilted into a dumping position, it will discharge through the grate in the scale platform, but when a truck, which is much longer than a wagon, is turned into a dumping position, the load will be dumped through the grate in the fixed platform. A truck is usually much wider than a wagon and, hence, the obliquely set door plates 27 will then be useful to assist in guiding the grain through the grate in the fixed platform. When horses are used to draw a wagon onto the scale platform, they must pass over the grate structures, and at such time, the door plates 27 must be turned down over the grate slats 24, and the grate slats 13 must then be turned into their closed positions. The cam bars for operating the grate slats 13, as is evident, afford very rigid supports therefor, so that when the grate is closed, it will support draft horses and other heavy loads.

The numeral 36 indicates a floor plate, (see Figs. 1 and 2), hinged to the fixed platform 10 at 37 and arranged to be normally turned down flush with the top of said fixed platform into a recessed seat formed in said platform immediately adjacent to the rear portion of the opening in which the grate bars 24 are mounted. This floor plate 36 is adapted to be turned upward and backward into an inclined position shown in Fig. 2 and to be supported in such position by a hinged lug 38 so that it will afford a hopper board at the rear of the grate structure of the fixed platform.

What I claim is:

1. The combination with a dumping platform having a pit opening, of a grate mounted in said opening and including grate slats mounted in said opening and movable from substantially horizontal positions in which they close said opening into oblique positions in which they open the same, said slats having pivot-forming trunnions located at the extreme edges thereof that are uppermost when said slats are in oblique positions.

2. The combination with a dumping platform having a pit opening, of a grate mounted in said opening and including grate slats mounted in said opening and movable from substantially horizontal positions in which they close said opening into oblique positions in which they open the same, said slats having pivot-forming trunnions located at the extreme edges thereof that are uppermost when said slats are in oblique positions, and means operative on said slats to simultaneously move the same from open to closed positions, and conversely.

3. The combination with a dumping platform having a pit opening, of a grate mounted in said opening and including grate slats mounted in said opening and movable from substantially horizontal positions in which they close said opening into oblique positions in which they open the same, said slats having their pivots located at the edges thereof that are uppermost when said slats are in oblique positions, and cam bars slidably mounted under said slats and having cam lugs that engage and support the same in closed positions.

4. The structure defined in claim 3 in which said cam bars are laterally spaced, are mounted for parallel movements and are combined with means for simultaneously imparting like sliding movements thereto.

5. The structure defined in claim 3 in which said cam bars are located one at each side and one at the center of the pit opening and are combined with means for imparting simultaneous like movements thereto.

6. The combination with a dumping platform having a pit opening, of metallic frame bars secured to the sides of said pit opening, grate slats extended across said pit opening in parallel arrangement and at the ends of their upper edge portions having trunnions pivotally seated in said frame bars, and cam bars slidably mounted on said frame bars and having cam lugs underlying and operating directly on the respective overlying slats to move the same from approximately horizontal closing positions into oblique opening positions.

In testimony whereof I affix my signature.

AUGUST P. WINTER.